United States Patent [19]

Norling

[11] 4,009,150
[45] Feb. 22, 1977

[54] TIME-LAPSE FREE-RADICAL POLYMERIZABLE COMPOSITION

[75] Inventor: Parry McWhinnie Norling, Memphis, Tenn.

[73] Assignee: E. I. Du Pont de Nemours and Company, Wilmington, Del.

[22] Filed: Apr. 2, 1975

[21] Appl. No.: 564,482

Related U.S. Application Data

[63] Continuation-in-part of Ser. No. 457,385, April 2, 1974, abandoned.

[52] U.S. Cl. .......................... 260/63 UY; 156/327; 428/500; 526/48; 526/92; 526/135; 526/146; 526/147; 526/303; 526/317; 526/328; 526/330; 526/341; 526/346; 526/348
[51] Int. Cl.$^2$ ................ C08F 20/10; C08F 120/14
[58] Field of Search ............. 260/892, 894, 89.5 R, 260/89.5 A, 89.1, 63, 93.7, 94.9, 78.4, 93.5, 88.7, 89.7, 80; 526/135, 146, 147, 48, 92, 303, 317, 328, 330, 341, 346, 348

[56] References Cited
UNITED STATES PATENTS

| | | | |
|---|---|---|---|
| 2,610,965 | 9/1952 | Vandenberg | 260/88.7 C |
| 2,612,490 | 9/1952 | Gould | 260/89.5 A |

*Primary Examiner*—Harry Wong, Jr.

[57] ABSTRACT

A time-lapse free-radical polymerizable composition which comprises (1) a free-radical polymerizable compound such as an ethylenically unsaturated monomer or a reactive polymer; (2) a soluble polymerization initiator such as a diacyl peroxide, a ketone peroxide; an alkyl peroxy ester, a dialkyl peroxide, or an inorganic persulfate; (3) a soluble, reducible metal chelate such as an iron or copper chelate in which the chelating agent is a $\beta$-dicarbonyl compound having an enol content of at least 4 percent and a dicarbonyl angle of not greater than 120°, or a $\beta$-hydroxy nitrogen-heterocyclic fused aromatic in which the hydroxyl group is attached to a carbon beta to the nitrogen in an adjacent ring; (4) a soluble organic reducing agent which is capable of reducing ferric ions to ferrous ions or cupric ions to cuprous ions; and (5) excess chelating agent in the amount of $10^{-4}$ to 2.5 moles of excess chelating agent per mole of reducible metal chelate. The length of the time-lapse before onset of polymerization can be controlled by the amount of excess chelating agent present without affecting the rate of polymerization once polymerization is initiated.

10 Claims, No Drawings

TIME-LAPSE FREE-RADICAL POLYMERIZABLE COMPOSITION

REFERENCE TO PRIOR APPLICATION

This application is a continuation-in-part of application Ser. No. 457,385 filed Apr. 2, 1974, and now abandoned.

BACKGROUND OF THE INVENTION

1. Field of the Invention

This invention relates to time-lapse free-radical polymerizable compositions and to the use of chelating agents to provide time-lapse free-radical polymerization reactions.

2. Description of the Prior Art

Numerous applications for polymers involve formation of the polymer in place. All of these applications involve the placement of a lower viscosity material on a suitable substrate followed by a controlled viscosity increase to a desired level. This increase may be brought about by solidification of a polymer melt, by evaporation of a solvent, or by a polymerization or crosslinking reaction. These polymerization and crosslinking reactions may be initiated by heat and a catalyst, or by a catalyst-activator combination which is effective at room temperature.

In many applications heat may be neither available nor practical, and thus polymerization must be conducted at ambient temperatures. For example, when the soil around a construction site is being stabilized by impregnating it with a polymerizable composition, it is not practical to apply heat to this reaction. When using polymerizable adhesive compositions to laminate large beams, the requirement of a large oven to promote polymerization of the adhesive composition would add considerably to its expense. In other cases substrate materials are heat sensitive, and thus cannot be placed in an oven. In many cases, solvent evaporation is not suitable because of insufficient control of reaction rate, because of rulings against air pollution, or because of inefficiency in confined quarters.

In German Pat. No. 848,258 a room temperature initiator system is described. This initiator system contains an oxidizing agent such as benzoyl peroxide, a reducing agent such as benzoin or acetoin, and a metal compound such as acetylacetone iron.

When an ambient temperature polymerization, initiated by a catalyst-activator system, is employed, time becomes a critical factor. Time is required to mix the monomer or prepolymer with the catalyst and to apply the polymerizable material to the desired substrate. The polymerization reaction must be slow enough to allow these operations, but it must be fast enough to give polymer formation in a reasonable length of time. As the amount of time required for applying the polymerizable material increases, by necessity, the rate of polymerization must be slowed down. Slow polymerization is especially undesirable, however, when clamps or molds are tied up in the operation or when the finished material is needed in a short period of time.

An alternative is to add an inhibitor to the polymerization system which gives an induction period. Such an inhibitor reacts with the active species of the catalyst-activator system thus stopping polymerization until the inhibitor is consumed. The length of the induction period will depend on both the catalyst and the inhibitor concentration. The larger the amount of inhibitor, the longer is the induction period and the smaller is the amount of catalyst available at the end of the induction period. Since the rate of polymerization is usually a function of the catalyst concentration, longer induction periods generally lead to a slower ultimate rate of polymerization. When long induction periods followed by a rapid polymerization are required, prohibitively high concentrations of both inhibitor and initiator are demanded.

SUMMARY OF THE INVENTION

It has now been discovered that an excess of certain chelating agents have the effect of delaying initiation of free-radial polymerization reactions in the presence of a polymerization initiator, such as a peroxide or persulfate, an iron or copper chelate, and an organic reducing agent, thereby extending the application time for the polymerizable composition, but without retarding the rate of polymerization once polymerization is initiated. This effect is referred to herein as "time-lapse catalysis". This invention provides time-lapse free-radical polymerizable compositions which comprise (1) free-radical polymerizable compound selected from the group consisting of ethylenically unsaturated monomers and reactive polymers, (2) soluble polymerization initiator selected from the group consisting of (a) diacyl peroxides, (b) ketone peroxides, (c) alkyl peroxy esters, (d) dialkyl peroxides, and (e) inorganic persulfate in the amount of $10^{-4}$ to $10^{-1}$ mole of initiator per mole of polymerizable compound, (3) soluble reducible metal chelate selected from the group consisting of iron and copper chelates in which the chelating agent is selected from the group consisting of (a) $\beta$-dicarbonyl compounds having an enol content of at least 4 percent and a dicarbonyl angle of not greater than 120°, and (b) $\beta$-hydroxy nitrogen-heterocyclic fused aromatics in which the hydroxyl group is attached to a carbon beta to the nitrogen in an adjacent ring, in the amount of $10^{-4}$ to $10^{-1}$ mole of reducible metal chelate per mole of polymerizable compound, (4) soluble organic reducing agent which is capable of reducing ferric ions to ferrous ions or cupric ions to cuprous ions in the amount of $10^{-3}$ to $10^{3}$ moles of reducing agent per mole of reducible metal chelate, and (5) excess chelating agent selected from the group consisting of (a) $\beta$-dicarbonyl compounds having an enol content of at least 4 percent and a dicarbonyl angle of not greater than 120°, and (b) $\beta$-hydroxy nitrogen-heterocyclic fused aromatics in which the hydroxyl group is attached to a carbon beta to the nitrogen in an adjacent ring, in the amount of $10^{-4}$ to 2.5 moles of excess chelating agent per mole of reducible metal chelate.

DETAILED DESCRIPTION OF THE INVENTION

The present invention is directed to free-radical polymerizable compositions in which the polymerizable species is one or more ethylenically unsaturated monomer or a reactive polymer. Suitable monomers include olefins such as ethylene, vinyl chloride, vinylidene chloride, and the like; vinyl esters of lower ($C_1$ to $C_{12}$) aliphatic carboxylic acids such as vinyl formate, vinyl acetate, vinyl propionate, and vinyl butyrate; unsaturated lower ($C_1$ to $C_6$) aliphatic mono- and di-carboxylic acids such as maleic, fumaric, succinic, acrylic, methacrylic, itaconic, crotonic, and the like; lower ($C_1$ to $C_6$) alkyl esters of unsaturated lower ($C_1$ to $C_6$) aliphatic mono- and di-carboxylic acids such as methyl methacrylate, ethyl acrylate, isopropyl acrylate, isobutyl acrylate, dimethyl maleate, ethylene glycol dimethacrylate, diethylene glycol dimethacrylate, tetraethylene glycol dimethacrylate, alkyl ($C_1$ to $C_{14}$) esters of unsaturated lower ($C_1$ to $C_6$) aliphatic mono- and dicarboxylic acids such as ethyl hexyl acrylate and lauryl acrylate, and the like; other unsaturated monomers such as styrene, acrylonitrile, methacrylamide, acrylamide, and methyl vinyl ketone; and mixtures of two or more of these monomers.

Reactive polymers which are suitable as polymerizable reactive species in that they undergo free-radical crosslinking reactions include unsaturated prepolymers such as diallyl phthalate prepolymers, unsaturated polyester resins commonly referred to as "alkyd resins", polybutadiene, polyisoprene, polystyrenebutadiene, and the like.

The polymerizable compositions of this invention may be formulated to undergo bulk polymerization or solution polymerization. When using bulk polymerization, development of strength properties is not dependent upon evaporation of solvents and diluents, but can proceed at a rapid rate. Suitable solvents, including water and organic solvents, may be used.

The second ingredient which must be present in the polymerizable composition is a soluble polymerization initiator of the peroxide or persulfate type. The term "soluble", whenever used herein, means soluble in the polymerization medium; that is, monomer soluble or solvent soluble. Suitable peroxides include diacyl peroxides such as benzoyl peroxide, 2,4-dichlorobenzoyl peroxide, para-chlorobenzoyl peroxide, diacetyl peroxide, lauroyl peroxide, caprylyl peroxide and the like; ketone and aldehyde peroxides such as methyl ethyl ketone peroxide, methyl isobutyl ketone peroxide, hydroxy heptyl peroxide, dibenzal diperoxide, cyclohexanone peroxide, and the like; alkyl peroxy esters such as tertiary butyl perbenzoate, ditertiary butyl diperphthalate, tertiary butyl peracetate, tertiary butyl peroxyisobutyrate, 2,5-dimethyl-2,5-bis(benzoylperoxy)hexane, and the like; and dialkyl peroxides such a dicumyl peroxide, 2,2-bis(tertiary butyl peroxy) butane, ditertiary butyl peroxide, and the like. Suitable persulfates include: potassium, sodium and ammonium persulfate. The polymerization initiator should be present in the amount of about $10^{-4}$ to $10^{-1}$ mole of polymerization initiator per mole of polymerizable compound. Preferably the initiator is present in the amount of about $10^{-3}$ to $10^{-2}$ mole per mole of polymerizable compound.

The third essential component of the polymerizable composition is a soluble, reducible metal chelate selected from the group consisting of iron and copper chelates derived from certain chelating agents.

One class of suitable chelates is β-dicarbonyl compounds having an enol content of at least about 4 percent and a dicarbonyl angle of not greater than about 120°. By "enol content" is meant the enol content measured at 25° C. as the pure compound rather than as a solvent solution. It has been found that βdicarbonyl compounds having a large enol contribution to the keto-enol equilibrium give a greater time-lapse effect than ones having a smaller contribution. An enol content of at least about 4 percent is required to provide significant results. An example of a β-dicarbonyl compound having an enol content below about 4 percent is diethyl compound having an enol content below about 4 percent is diethylmalonate. Preferably the β-dicarbonyl compound has an enol content of at least about 30 percent.

By "dicarbonyl angle" is meant the angle formed by the intersection of a line extending from the carbonyl oxygen through the carbonyl carbon of the carbonyl group with a line extending from the hydroxyl oxygen through the hydroxyl carbon in a model of the compound in the enol form. When these lines are parallel, as in the case of 2,4-pentanedione, they intersect at infinity whereby the dicarbonyl angle is zero. These lines are assumed to be in the same plane since, in the enol form, the five atoms in the basic structure

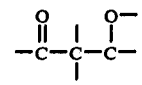

are in the same plane. Examples of compounds having a dicarbonyl angle in excess of 120° are 1,3-indandione and 1,3-cyclobutanedione.

One preferred class of β-dicarbonyl compounds is β-diketones of the formula

in which R is hydrogen, lower-alkyl ($C_1$ to $C_4$) or aryl, Y and Y' are aryl or —CXX'B wherein X and X' are hydrogen or halogen, and B is hydrogen, halogen or lower-alkyl ($C_1$ to $C_8$). Typical β-diketones of this structure include 2,4-pentanedione, 1,1,1-trifluoro-2,4-pentanedione, 1,1,1,5,5,5-hexafluoro-2,4-pentanedione, 2,4-hexanedione, 2,4-heptanedione, 5-methyl-2,4-hexanedione, 2,4-octanedione, 5,5-dimethyl-2,4-hexanedione, 3-ethyl-2,4-pentanedione 2,4-decanedione, 2,2-dimethyl-3,5-nonanedione, 3-methyl-2,4-pentanedione, 2,4-tridecanedione, 1-cyclohexyl-1,3-butanedione, 5,5-dimethyl-1,3-cyclohexanedione, 1,3-cyclohexanedione, 1-phenyl-1,3-butanedione, 1(4-biphenyl)-1,3-butanedione, 1-phenyl-1,3-pentanedione, 3-benzyl-2,4-pentanedione, 1-phenyl-5,5-dimethyl-2,4-hexanedione, 1-phenyl-2-butyl-1,3-butanedione, 1-phenyl-3-(2l-methoxyphenyl)-1,3-propanedione, 1-(4-nitrophenyl)-1,3-butanedione, 1-(2-furyl)-1,3-butanedione, 1-(tetrahydro-2-furyl)-1,3-butanedione and dibenzoylmethane.

Another preferred class of β-dicarbonyl compounds is β-keto esters of the formula

in which R is hydrogen, lower-alkyl ($C_1$ to $C_4$) or aryl, Y and Y' are aryl or —CXX'B wherein X and X' are hydrogen or halogen, and B is hydrogen, halogen or lower-alkyl ($C_1$ to $C_8$). Typical examples of these esters are methyl acetoacetate, ethyl acetoacetate, α-methyl ethylacetoacetate, α-n-butyl ethylacetoacetate, α-sec.-butyl ethylacetoacetate, α-ethyl methylacetoacetate, and α-ethyl ethylacetoacetate. Other β-dicarbonyl compounds which are suitable include α-acetyl-γ-butyrolactone, dimedone and 1-hydroxyanthraquinone.

Another class of suitable chelating agents is β-hydroxy nitrogen-heterocyclic fused aromatics in which the hydroxyl group is attached to a carbon in an adjacent ring beta to the nitrogen. These compounds contain the structure

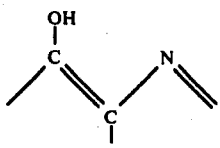

or its resonsance equivalent structure

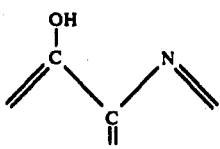

The preferred β-hydroxy nitrogen-heterocyclic fused aromatics are the 8-hydroxyquinolines of the formula

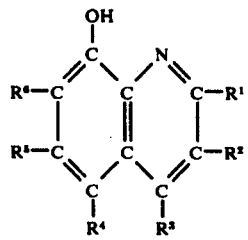

in which $R^1$, $R^2$, $R^3$, $R^4$, $R^5$, and $R^6$ are hydrogen, halogen or lower-alkyl ($C_1$ to $C_4$). Other fused aromatics of this type include 7-hydroxy-3-hydrogen indoles, 8-hydroxy quinoxalines 8-hydroxy quinazolines, 8-hydroxy cinnolines, 4-hydroxy phenanthridines of the structure

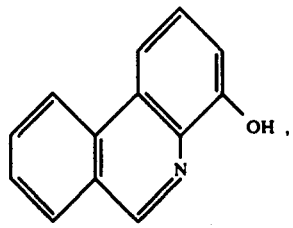

4-hydroxy acridines and 1-hydroxy phenazines of the structure

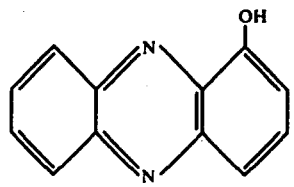

The reducible metal chelate should be present in the polymerizable composition in the amount of about $10^{-4}$ to $10^{-1}$ mole of reducible metal chelate per mole of polymerizable compound. Preferably the reducible metal chelate is present in the amount of about $10^{-3}$ to $10^{-2}$ mole per mole of polymerizable compound.

The fourth ingredient which should be present in the polymerizable composition is a soluble, organic reducing agent which is capable of reducing ferric ions to ferrous ions or cupric ions to cuprous ions. One class of reducing agents which are suitable for use in accordance with this invention is α-hydroxy ketones. The preferred α-hydroxy ketones are those of the formula

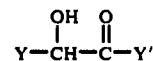

in which Y and Y' are aryl or —CXX'B wherein X and X' are hydrogen or halogen, and B is hydrogen, halogen or loweralkyl ($C_1$ to $C_8$). Typical examples of α-hydroxy ketones of this structure include benzoin, acetoin and α-hydroxyacetophenone.

Another class of reducing agents which are suitable for use in accordance with this invention is fused aromatic β-hydroxy ketones in which the hydroxyl group is attached to a carbon in an adjacent ring beta to the keto group. These β-hydroxy ketones contain the structure

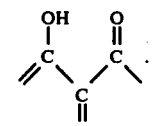

Typical examples of β-hydroxy ketones of this type include naphthazarin of the formula

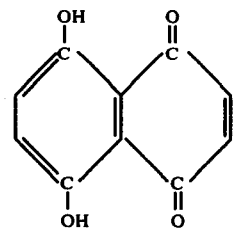

1-hydroxy-9-fluorenone of the structure

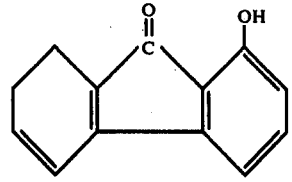

and 1-hydroxy anthraquinone of the structure

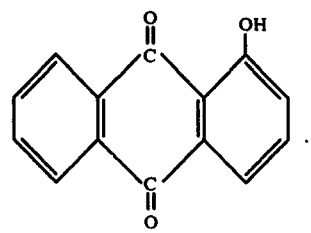

Still other suitable reducing agents include hydroxy esters such as dialkyl dihydroxy maleates and ascorbic acid, and hydroxy acids such as citric acid. These reducing agents should be present in the amount of about $10^{-3}$ to $10^3$ moles of reducing agent per mole of reducible metal chelate. Preferably the reducing agent is present in the amount of about $10^{-2}$ to 10 moles per mole of reducible metal chelate.

The fifth ingredient which must be present in the polymerizable compositions of this invention is excess chelating agent selected from the group consisting of (a) $\beta$-dicarbonyl compounds having an enol content of at least about 4 percent and a dicarbonyl angle of not greater than about 120° and (b) $\beta$-hydroxy nitrogen-heterocyclic fused aromatics in which the hydroxyl groups is attached to a carbon beta to the nitrogen in an adjacent ring. Since the reducible metal chelate may be formed in situ by reacting a suitable metal salt with the chelating agent, this excess chelating agent should be present as free chelating agent, that is, in an amount in excess of the amount which enters into the reducible metal chelate. This excess chelating agent should be present in the amount of about $10^{-4}$ to 2.5 moles of excess chelating agent per mole of reducible metal chelate. The exact amount of excess chelating agent used in any given situation will be determined by the length of the time-lapse period desired. Within this range of excess chelating agent, time-lapse periods ranging from micro seconds to 24 hours or longer can be readily achieved.

Although it is essential that the above five ingredients be present in the polymerizable compositions of this invention, there is no reason to exclude additional components which may impart beneficial properties to the composition without detracting from the effectiveness of the essential ingredients. Accordingly, these compositions may also contain other additives such as fillers, pigments, toners, dyes, antioxidants, flow control agents, blowing agents, plasticizers, and the like. The composition may contain, in addition to the reactive polymers that undergo free radical crosslinking reactions, other polymers. Polymers which are soluble or at least partly soluble in the polymerizable monomers or the reactive polymers are preferred. Suitable polymers have molecular weights in the range of about 10 thousand to 1 million or more. Among those useful are the following: chlorosulfonated polyethylene, chlorinated polyethylene, bromo butyl rubber, fluoroelastomers such as vinylidene fluoride/ hexafluoropropene polymer, vinylidene fluoride/hexafluoropropene/tetrafluoroethylene polymer; chloroprene polymers such as polychloroprene, methyl methacrylate/chloroprene polymer; polyester polymers such as bisphenol A/fumaric acid polyester, terephthalate-maleic acid based polyesters; vinyl chloride polymers such as vinyl chloride/vinyl acetate copolymer; acrylate polymers such as polyethyl acrylate, styrene/butyl acrylate polymer, ethyl acrylate/methyl methacrylate polymer, ethylene/methyl acrylate polymer, n-butyl methacrylate/isobutyl methacrylate polymer; hydrocarbon polymers such as polyisoprene, polystyrene, pale crepe natural rubber, styrene/butadiene rubber; polyalkylene ethers such as polyepichlorohydrin; vinyl acetate polymers such as ethylene/vinyl acetate polymer; polyurethane polymers such as polytetramethylene ether glycol/2,4-toluene diisocyanate polyurethane, polytetramethylene ether glycol/trimethylolpropane diallyl ether/2,4 and 2,6-toluene diisocyanate polyurethane; and acrylonitrile copolymers such as butadiene/acrylonitrile polymers. Mixtures of these polymers may also be employed. Some of these polymers act merely as flow control agents while others, especially those polymers having reactive sites, may become involved in the polymerization reaction. The amount and type of additive will be determined by the particular application.

Because the compositions of this invention are reactive at room temperature, the total composition should not be mixed together until it is ready for use. These compositions therefore cannot be handled in commerce as preformed compositions, but must be handled as multipackage compositions.

The polymerizable compositions of this invention may be used in a wide range of applications. For example, they provide excellent adhesive compositions for applications such as laminating large beams where a considerable amount of time is necessary to apply the adhesive to the surface of the beam and room temperature curing is necessary. The compositions of this invention are quite fluid when initially mixed and remain fluid until the prescribed time-lapse period has passed, after which polymerization proceeds at an uninhibited rate. The polymerizable compositions are also useful in coating applications and in printing compositions such as inks. In this case, iron chelates impart a red color and copper chelates impart a bluish color. The polymerizable compositions of this invention are also suitable for use is stabilizing soil. In this application the polymerizable composition will generally be diluted with water to increase its ability to penetrate into the soil. Solvent containing compositions are also useful for penetrating other porous substrates such as increasing the density of wood by vacuum impregnation with the polymerizable composition. The polymerizable compositions are also useful as sealants and as potting compounds for encapsulation of electrical components.

EXAMPLES OF THE INVENTION

The following examples illustrating the novel polymerizable compositions of this invention and their use are given without any intention that the invention be limited thereto. All parts and percentages are by weight unless otherwise specified.

EXAMPLE 1

Impregnation of Wood With Methyl Methacrylate

A 2 in. (5 cm.) × 2 in. (5 cm.) × ¾ in. (1.9 cm.) maple block (38.4 g.) was placed in a 500 ml. resin flask. The flask was evacuated on the water aspirator for 15 minutes thereby removing air from the maple block. The following solution was then added at room temperature (27° C.): 200 ml. of commercial methyl methacrylate (containing a small amount of inhibitor), 4.0 g. of benzoin, 0.25 g. of ferric acetylacetonate, 0.05 g. of 2,4-pentanedione, and 2.0 g. of benzoyl peroxide. After 15 minutes the flask was opened to the atmosphere, whereby the polymerizable composition impregnated the maple block. After another two hours the wood sample was removed and wrapped in aluminum foil. At the end of 4 hours the impregnation bath solution had become very viscous, indicating that polymerization had commenced. After 24 hours the block was unwrapped and weighed. It was now one-third by weight polymer. It was sanded to give a glossy surface which was free from the smell of monomer. Such wood/polymer composites are useful in flooring, table tops, bowling pins, shafts for pool cues, and the like. When the process was repeated without 2,4-pentanedione, impregnation was not possible because the material in the flask polymerized with liberation of heat in 15 minutes.

EXAMPLE 2

Crosslinking of Unsaturated Elastomers

At room temperature (27° C.) 3.3 parts of several unsaturated elastomers were added to 100 parts of toluene. To each was added 0.33 part of benzoyl peroxide, 0.165 part of ferric acetylacetonate, and 2.0 parts of acetoin. Various amounts of 2,4-pentanedione were added and the gel time, that is, the time after which the solution could no longer be stirred by hand, was noted. Table I gives the results:

TABLE I

| Elastomer | Parts 2,4-Pentanedione | Gel Time, min. |
|---|---|---|
| Shell polyisoprene | 0 | 20 |
|  | 0.03 | 30 |
|  | 0.09 | 240 |
| Firestone Duradene | 0 | 11 |
| (Styrene-Butadiene) | 0.03 | 35 |
|  | 0.06 | 85 |
|  | 0.12 | (a) |

(a) Placed in pan, solvent evaporated, gave vulcanizate insoluble in toluene.

This crosslinking process imparts solvent resistance to the elastomers.

EXAMPLE 3

Time-Lapse Polymerization in Water

Ten parts of 2-hydroxyethyl methacrylate (a water-soluble monomer which polymerizes to an insoluble gel) were added to 90 parts of water at room temperature (27° C.). Then 0.4 part of potassium persulfate, 1.0 part of acetoin, and 0.2 part of ferric acetylacetonate were added. Various amounts of 2,4-pentanedione were added, and the time required for the appearance of the gel was noted. Table II gives the results:

TABLE II

| Parts 2,4-Pentanedione | Gel Time, min. |
|---|---|
| 0 | 4 |
| 0.01 | 12 |
| 0.02 | 15 |
| 0.20 | 40 |

Such a process is useful for the stabilization of sand and soil.

EXAMPLE 4

Time-Lapse Wood Adhesives

Two hundred parts of a low molecular weight polyvinyl acetate (88 percent hydrolyzed, viscosity of 5 centipoises as a 4 percent solution in water) were added to 100 parts of tetraethylene glycol dimethacrylate. To this mixture were added 20 parts of benzoyl peroxide, 20 parts of ferric acetylacetonate, and 8 parts of acetoin. This mixture was spread between 2 in. (5 cm.) × 2 in. (5 cm.) × 0.75 in. (1.9 cm.) maple blocks to give 1.75 in. (3.5 cm.) × 2 in. (5 cm.) lap joints. The blocks could not be separated or moved past one another by hand after being in contact with each other for 15 minutes. By adding from 0.2 to 8 parts of 2,4-pentanedione, the application time could be increased incrementally with the maximum being three hours. After 48 hours all the bonds were tested according to ASTM D90549. All bonds had strengths in excess of 1000 psi.

EXAMPLE 5

Preparation of a Time-Lapse Coating

To a 25 percent solution of polymethyl methacrylate in methyl methacrylate monomer were added the following catalyst-activator components in the listed molar (M) concentrations: benzoyl peroxide (0.1M), benzoin (0.033M), and ferric acetylacetonate (0.07M). Various amounts of 2,4-pentanedione were added. The times that it took for these solutions to achieve a tack-free surface are listed in Table III:

TABLE III

| 2,4-Pentanedione, moles/liter | Tack-Free time, min. |
|---|---|
| 0 | 100 |
| 0.002 | 110 |
| 0.004 | 160 |
| 0.008 | 295 |
| 0.011 | 315 |
| 0.02 | 360 |

These compositions are useful as red coatings for wood.

EXAMPLE 6

Preparation of a Lightly Colored Coating

To 200 cc. of 25 percent polymethyl methacrylate in methyl methacrylate monomer were added 0.2 g. of wax, 2.0 g. of benzoyl peroxide, 2.0 g. of benzoin, and 2.5 g. of cupric acetylacetonate. A tack-free coating was obtained in 68 hours. When 1.25 g. of 2,4-pentanedione were added to the above recipe, the tack-free time at room temperature (27° C.) was lengthened to 92 hours. The resulting composition was useful as a pale blue coating composition.

EXAMPLE 7

Direct Observation of The Time-Lapse Effect For Methyl Methacrylate

Since vinyl monomers show a shrinkage rate which is directly proportional to the rate of polymerization, observation of volume changes allow one to monitor the course of the polymerization. A simple device for doing this, described by A. V. Tobolsky and L. Matlack, J. Polymer Sci. 55, 49 (1961), was used in this example. One ml. pipettes calibrated in 0.01 were joined to 15 ml. test tubes. These were filled with monomer or monomer diluted with solvent containing the necessary catalysts and activators. The device was placed in a constant-temperature bath and the rate of shrinkage (percent per minute) and the time to reach the maximum shrinkage rate was noted. Table IV gives observations at 30° C. for methyl methacrylate (distilled to remove inhibitor) containing 0.0189M benzoin, 0.0338M ferric acetylacetonate, and 0.05M benzoyl peroxide and various concentrations of 2,4-pentanedione.

TABLE IV

| 2,4-Pentanedione, M | Maximum Shrinkage Rate | Time, min. |
|---|---|---|
| 0 | 0.096 | 40 |
| 0.0005 | 0.094 | 45 |
| 0.0015 | 0.102 | 95 |
| 0.0025 | 0.081 | 160 |

TABLE IV-continued

| 2,4-Pentanedione, M | Maximum Shrinkage Rate | Time, min. |
|---|---|---|
| 0.005 | 0.084 | 250 |

When the methyl methacrylate was diluted to 35 percent in benzene with all other conditions remaining the same, the results in Table V were obtained.

TABLE V

| 2,4-Pentanedione, M | Maximum Shrinkage Rate | Time, min. |
|---|---|---|
| 0 | 0.041 | 25 |
| 0.0005 | 0.038 | 35 |
| 0.0015 | 0.036 | 60 |
| 0.0025 | 0.040 | 85 |
| 0.004 | 0.037 | 105 |
| 0.005 | 0.035 | 145 |
| 0.006 | 0.037 | 220 |

EXAMPLE 8

Direct Observation of The Time-Lapse Effect For Vinyl Acetate

Using a procedure similar to that used in Example 7, a 35 percent solution of vinyl acetate in benzene was prepared. The solution was made 0.0475M in benzoin, 0.0338M in ferric acetylacetonate, and 0.05M in benzoyl peroxide, and contained 2,4-pentanedione in the concentration listed in Table VI. Observations were made at 30° C.

TABLE VI

| 2,4-Pentanedione, M | Maximum Shrinkage Rate | Time, min. |
|---|---|---|
| 0 | 0.147 | 0 |
| 0.0015 | 0.146 | 15 |
| 0.0025 | 0.165 | 20 |
| 0.005 | 0.165 | 30 |
| 0.025 | 0.150 | 270 |

EXAMPLE 9

Direct Observation of Time-Lapse Periods For Various Time-Lapse Agents

A. Using a procedure similar to that used in Example 7, 35 percent solutions of methyl methacrylate (distilled to remove inhibitor) in benzene were prepared. These were made 0.0475M in benzoin, 0.0169M in ferric acetylacetonate, and 0.05M in benzoyl peroxide. Various concentrations of time lapse agents were added and the times to reach the maximum shrinkage rate were noted. The results obtained at 30° C. are in Table VII.

TABLE VII

| Time Lapse Agent | Concentration, M | Time, min. |
|---|---|---|
| Dibenzoyl methane | 0.00224 | 100 |
| 8-Hydroxyquinoline | 0.00518 | 240 |
| 2,4-Pentanedione | 0.005 | 200 |
| 2,4-Pentanedione | 0.0025 | 100 |

B. Other time-lapse agents were studied in 35 percent methyl methacrylate in benzene which was made 0.0189M in benzoin, 0.0338M in ferric acetylacetonate, and 0.05M in benzoyl peroxide. Ten ppm. of inhibitor (monomethyl ether of hydroquinone) remained in the monomer. Table VIII gives the observed time to reach maximum shrinkage rate with 0.005M concentration of various time lapse agents at 30° C.

TABLE VIII

| Time Lapse Agent | Time, min. |
|---|---|
| None | Less than 25 |
| 2,4-Pentanedione | 95 |
| Trifluoro-2,4-pentanedione | 105 |
| Hexafluoro-2,4-pentanedione | 115 |
| Ethylacetoacetate | 55 |

Note that the induction period for the 2,4-pentanedione is less in this example than in Example 7 (Table V) because of the effect of the inhibitor.

EXAMPLE 10

Observation of Polymerization With Tertiary Butyl Perbenzoate

Using a procedure similar to that used in Example 7, 3.24M solutions of methyl methacrylate in benzene were prepared. These were made 0.0189M in benzoin, and 0.0338M in ferric acetylacetonate and contained 1.25 g. per 100 ml. of t-butyl perbenzoate. Various amounts of 2,4-pentanedione were added to the solutions and the times to reach the maximum rate of shrinkage were measured at 30° C. The results are given in Table IX.

TABLE IX

| 2,4-pentanedione, M | Time, min. |
|---|---|
| 0 | 20 |
| 0.0005 | 40 |
| 0.005 | 90 |

EXAMPLE 11

To a solution of 20 g. of the polymers shown in Table X in 80 g. of 2-ethylhexyl acrylate was added 0.8 g. ethylene glycol dimethacrylate, 6.0 bis glycidyl ether of hydroquinone (sold as Epon 828 by Shell Chemical Co.), 6.25 g. of 40% benzoyl peroxide in dibutyl phthalate plasticizer (sold as Cadox 40E by Nourychem Corp.), 0.7 g. benzoin, and 33.3 g. of filler. The filler consisted of 68.8 parts $CaCO_3$, 16.5 parts talc, 5 parts silica, and 10 parts $TiO_2$. While the composition was blended on a three-roll paint mill, 0.16 g. acetylacetone and 2.5 g. ferric acetylacetonate were added. The time at which the ferric salt was added was noted for the determination of "gel time" as described below.

An aliquot of the above mixture was poured into a 4" × ⅝" × ⅛" mold and allowed to cure at room temperature between two sheets of Mylar (Du Pont trademark) polyester film in a press. The press was initially at a pressure of ca 10,000 psig, and the samples were kept in the mold for 70 or more minutes. The resulting slab was then tested for tensile properties using ASTM method D-412. Shore A hardness was measured by ASTM method D-676. The physical data for a number of elastomeric void fillers based on various polymers are given in Table X.

TABLE X

| Dissolved Polymer | Hardness Shore A | $E_B$% | $T_B$, psi | $M_{100}$ psi |
|---|---|---|---|---|
| Ethylene-53 wt. % methyl acrylate copolymer | 15 pts | 410 | 205 | 45 |
| Chlorinated polyethylene[a] | 13 | 530 | 185 | 38 |
| Neoprene[b] | 44 | 125 | 220 | 180 |

TABLE X-continued

| Dissolved Polymer | Hardness Shore A | $E_B$% | $T_B$, psi | $M_{100}$ psi |
|---|---|---|---|---|
| Chlorosulfonated Polyethylene[c] | 14 | 460 | 142 | 29 |
| Styrene-butyl acrylate Copolymer[d] | 64 | 350 | 170 | 130 |

[a]Polyethylene (M.I. = 17-20) with 32.2% Cl.
[b]Diethyl xanthogen disulfide modified polychloroprene, Mooney Viscosity - 43.
[c]Polyethylene (M.I. = 17-20) with 30.2% Cl, 0.73% S.
[d]Pliolite AC sold by Goodyear Tire and Rubber Co.

A second aliquot of the mixture was placed in an insulated one-inch diameter vial at room temperature to a depth of one inch with a thermocouple probe in the center. The thermocouple probe was attached to a multipoint recorder on which the thermal history of the sample could be traced. The sample remained at room temperature for almost an hour before an exotherm commenced. The sample reached 30° C. at ca 60 minutes from the introduction of the ferric salt, defined as zero time, and reached a maximum temperature at ca 65 minutes. In a separate experiment it was shown that the viscosity of the sample did not increase prior to the onset of the exotherm. Thus "gel time" is defined as the time at which temperature of the sample increases to 30° C. The "cure" time is defined as the time at which maximum temperature is reached. These definitions are similar to those used in descriptions of curing characteristics for thermosetting polyester resin compositions.

The sample containing the ethylene/methyl acrylate copolymer had a "gel time" of 61 min. and a "cure time" of 66 min. The other samples had similar gel and cure times.

EXAMPLE 12

A masterbatch was prepared containing 70 g. of a chlorosulfonated polyethylene (polyethylene M.I. = 100, 43% Cl. 1.1% S), 140 g. 2-ethylhexyl acrylate, 1.6 g. ethylene glycol dimethacrylate, 12.0 g. bis glycidyl ether of hydroquinone (see Example 11), 2.5 g. ferric acetylacetonate, and 66.7 g. filler (see Example 11). Aliquots of the masterbatch were blended on a three-roll paint mill with t-butyl perbenzoate, benzoin, and acetylacetone, in the amounts shown in Table XI. Approximately 13 g. of each sample were placed in a vial (1"diam.) into which a thermocouple was immersed. The temperature profile was traced by a multipoint recorder as described in Example II. Table XI shows the delay in the cure as a function of acetylacetone level.

TABLE XI

|  | A | B | C | D |
|---|---|---|---|---|
| Masterbatch (g.) | 50 | | | |
| t-Butyl perbenzoate (g.) | 0.8 | | | |
| Benzoin (g.) | 0.3 | | | |
| Acetylacetone (g.) | 0 | 0.01 | 0.02 | 0.03 |
| Time to gel (min.) | 51 | 55 | 160 | 228 |
| Time to cure (min.) | 57 | 86 | 167 | 254 |

A second aliquot of each sample was poured into a 2½" × 1" × ½" mold. All the samples cured tack-free at the air-exposed surface to give a soft elastomeric material suitable for use as a sealant.

EXAMPLE 13

A masterbatch was prepared from 400 g. of a 35% solution of chlorosulfonated polyethylene (polyethylene M.I. = 100) with 43% Cl, 1.1% S in lauryl acrylate, 3.2 g. of ethylene glycol dimethacrylate, 24.0 g. of the bis glycidyl ether of hydroquinone (see Example 11), 10.0 g. of t-butyl perbenzoate, 3.6 g. of benzoin, and 133.4 g. of filler (see Example 11). On a three-roll paint mill the amounts of acetylacetone shown in Table XII were added to 100 g. aliquots of the mixture described above. Then 1.8 g. ferric acetylacetonate was added to each aliquot (defined as zero time). The delay in the cure as a function of acetylacetone concentration was followed by the temperature profile as described in Example 11. Due to higher stock temperatures after milling, "gel" time was defined as the time at which the sample temperature reached 35° C. The data are shown in Table XII.

TABLE XII

|  | A | B | C | D |
|---|---|---|---|---|
| Mg. acetylacetone/100 g. masterbatch | 0 | 20 | 60 | 120 |
| "Gel" time (min.) to 35° C. | 36 | 38 | 44 | 67 |
| "Cure" time (min.) | 50 | 52 | 58 | 77 |

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

I claim:
1. A polymerization medium which comprises
   1. free-radical polymerizable compound which is an ethylenically unsaturated monomers;
   2. polymerization initiator soluble in the polymerization medium selected from the group consisting of
      a. diacyl peroxides,
      b. ketone peroxides,
      c. alkyl peroxy esters,
      d. dialkyl peroxides, and
      e. inorganic persulfates
      in the amount of $10^{-4}$ to $10^{-1}$ mole of polymerization initiator per mole of free radical polymerizable compound;
   3. reducible metal chelate soluble in the polymerization medium selected from the group consisting of iron and copper chelates in which the chelating agent is selected from the group consisting of
      a. βdicarbonyl compounds having an enol content of at least 4 percent and a dicarbonyl angle of not greater than 120°, and
      b. β-hydroxy nitrogen-heterocyclic fused aromatics in which the hydroxyl group is attached to a carbon beta to the nitrogen in an adjacent ring in the amount of $10^{-4}$ fo $10^{-1}$ mole of reducible metal chelate per mole of free radical polymerizable compound;
   4. organic reducing agent soluble in the polymerization medium which is capable of reducing ferric ions to ferrous ions or cupric ions to cuprous ions in the amount of $10^{-3}$ to $10^3$ moles of reducing agent per mole of reducible metal chelate, and

5. excess chelating agent selected from the group consisting of
   a. β-dicarbonyl compounds having an enol content of at least 4 percent and a dicarbonyl angle of not greater than 120°, and
   b. β-hydroxy nitrogen-heterocyclic fused aromatics in which the hydroxyl group is attached to a carbon beta to the nitrogen in an adjacent ring, in the amount of $10^{-4}$ to 2.5 moles of excess chelating agent per mole of reducible metal chelate.

2. the polymerization medium of claim 1 in which the reducible metal chelate is present in the amount of $10^{-3}$ to $10^{-2}$ mole per mole of monomer.

3. The polymerization medium of claim 2 in which the reducing agent is present in the amount of $10^{-2}$ to 10 moles per mole of reducible metal chelate.

4. The polymerization medium of claim 3 in which the polymerization initiator is present in the amount of $10^{-3}$ to $10^{-2}$ mole per mole of polymerizable compound.

5. The polymerization medium of claim 4 in which the reducible metal chelate is ferric acetylacetonate and the excess chelating agent is 2,4-pentanedione.

6. The polymerization medium of claim 1 in which the polymerization initiator is benzoyl peroxide.

7. The polymerization medium of claim 1 in which the polymerization initiator is potassium persulfate.

8. The polymerization medium of claim 6 in which the soluble organic reducing agent is benzoin.

9. The polymerization medium of claim 1 in which the polymerization initiator is tertiary butyl perbenzoate.

10. The polymerization medium of claim 1 in which free radical polymerizable compound which is an ethylenically unsaturated monomer is selected from the class consisting of olefins, vinyl esters of lower aliphatic carboxylic acids, unsaturated lower aliphatic mono- and dicarboxylic acids, alkyl esters of unsaturated lower aliphatic mono- and dicarboxylic acids, styrene, acrylonitrile, methacrylamide, acrylamide and methyl vinyl ketone.

* * * * *